Aug. 24, 1965  J. L. DREISZIGER  3,202,237
MOTOR VEHICLE SUSPENSION SYSTEM OF THE INDEPENDENT TYPE
Filed Nov. 22, 1963  2 Sheets-Sheet 1
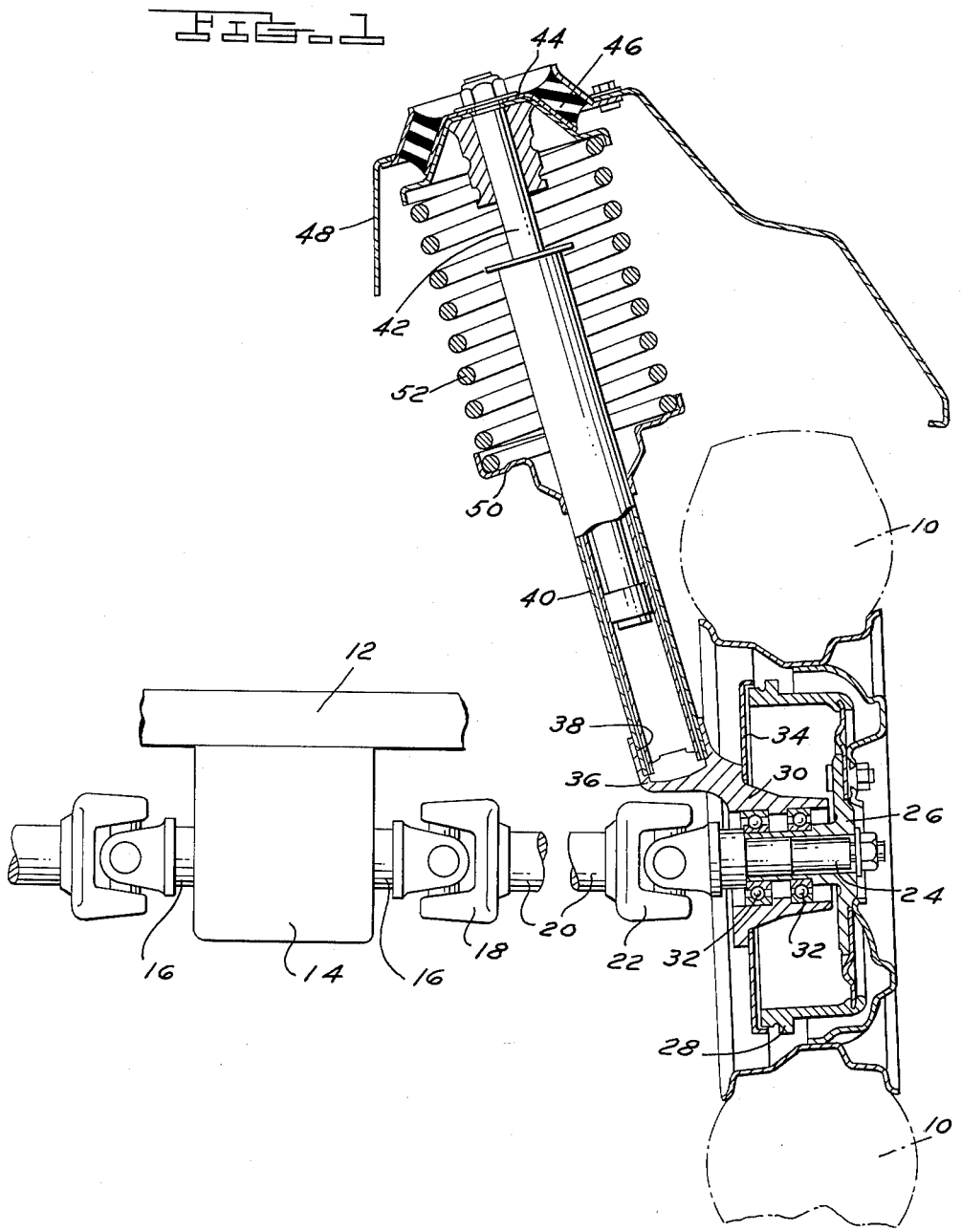
JOZSEF L. DREISZIGER
INVENTOR.
BY John R. Faulkner
Clifford L. Sadler
ATTORNEYS

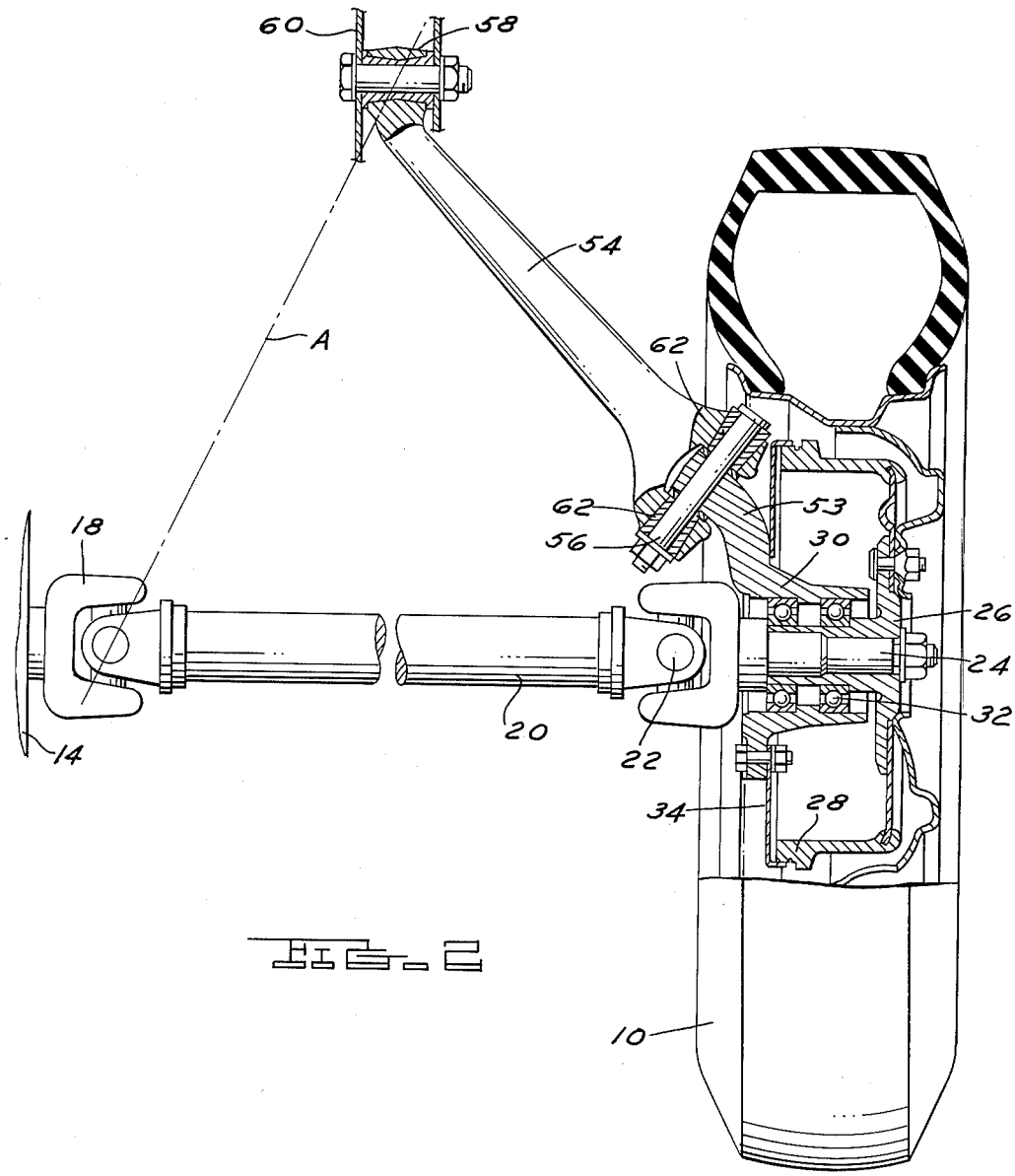

United States Patent Office 3,202,237
Patented Aug. 24, 1965

3,202,237
MOTOR VEHICLE SUSPENSION SYSTEM OF THE INDEPENDENT TYPE
Jozsef L. Dreisziger, Basildon, Essex, England, assignor to Ford Motor Company, Dearborn, Mich., a corporation of Delaware
Filed Nov. 22, 1963, Ser. No. 325,600
Claims priority, application Great Britain, Dec. 12, 1962, 46,845/62
6 Claims. (Cl. 180—73)

This invention relates to an independent suspension system for a motor vehicle.

An independent vehicle suspension constructed according to this invention has a wheel rotatably mounted on a wheel support member. A nonextensible transversely extending articulated shaft connects the wheel assembly with the chassis of the vehicle. A combination coil spring-shock absorber unit is rigidly secured to the wheel support member at its lower end. The upper end of the unit is connected to the vehicle body. A trailing link is pivotally connected at its forward end to the chassis and at its rearward end to the wheel support member.

This invention is applicable to both driven and non-driven wheels. In the case of driven wheel embodiments, the transverse shaft comprises a drive shaft having inner and outer universal joints. The outer universal joint is connected to the wheel and the inner one is connected to the differential. The wheel support member constitutes a bearing housing that rotatably supports the wheel.

As applied to a nondriven wheel suspension, the lateral shaft may have simple pivotal connections at its inner and outer ends. The outer end would be connected to the wheel support member which might comprise a spindle for rotatably supporting the wheel.

The coil spring-shock absorber combination unit, owing to its rigid connection to the wheel support member, controls angular movement of the wheel about a longitudinal axis that passes through the outer joint. The lateral shaft is nonextensible so as to resist transverse forces. It positions the wheel laterally with respect to the chassis. The trailing link controls movement of the wheel support member about a vertical axis that passes through the outer joint. The suspension is thus simple since only two joints are employed on the lateral shaft and two pivotal connections are employed on the trailing link.

Preferably, the pivotal axis of the connection between the trailing link and the bearing housing is parallel to a line joining the inner universal joint and the center of the pivotal connection between the link and the chassis of the vehicle.

The many objects and advantages of the present invention will become amply apparent from the following description when considered in connection with the accompanying drawings, in which:

FIGURE 1 is a vertical elevational view partly in section of an independent rear suspension for a motor vehicle constructed according to this invention; and FIGURE 2 is a top plan view partly in section of the suspension illustrated in FIGURE 1.

The suspension of FIGURE 1 resiliently supports and positions the vehicle chassis and body on a wheel assembly 10. The invention is illustrated in connection with driven wheels of a vehicle.

A chassis frame member 12 supports a differential gear unit 14 that has left and right output members 16. The output members 16 are connected by an inner universal joint 18 to a nonextensible drive shaft 20. The outer end of the drive shaft 20 has a second universal joint 22.

A splined drive spindle 24 has its one end connected to the outer universal joint 22 and its other end in splined engagement with a wheel hub 26. The spider portion of the wheel assembly 10 is bolted to the hub 26. A brake drum 28 is also bolted to the hub 26.

A bearing housing 30 rotatably supports the hub 26 by a span of ball bearings 32. A brake backing plate 34 is connected to the housing 30 and carries the brake shoes and other components of the brake assembly. These components cooperate with the drum 28 in the usual fashion.

The housing 30 has an integral extension or arm 36 with an upwardly opening socket 38. A shock absorber assembly 40 has its lower end fitted in the socket 38 and welded to the extension 36.

The piston rod portion 42 of the shock absorber assembly 40 is bolted to a sheet metal spring seat 44 at its upper end. A rubber mount 46 secures the spring seat 44 to body sheet metal 48.

A lower spring seat 50 is welded to the exterior tube of the shock absorber 40. A coil spring 52 is positioned between the upper spring seat 44 and the lower spring seat 50. Spring 52 is loaded in compression and resiliently supports the vehicle body on the wheel assembly 10. The shock absorber and coil spring assembly constitutes a linearly extendible and collapsible load supporting suspension unit.

The rubber mount 46 which connects the upper spring seat 44 with the body sheet metal 48 permits the piston rod 42 to move axially upward approximately three-eighths of an inch. It also restricts pivotal radial movement of the piston rod 42 to about one-sixteenth of an inch. The shock absorber unit 40 thus prevents rotation about the axis of the drive spindle 24. In conjunction with the drive shaft 20, it controls the angle that the axis of the spindle 24 makes with the horizontal.

The housing 30 has a second integral extension 53 to which a trailing suspension link 54 is pivotally connected by a pivot pin 56. The forward end of trailing link 54 is secured by a rubber bushing 58 to a chassis member 60. The link 54 is arranged at a generally acute angle to the axis of the shaft 20 when seen in the plan view. The rubber bushing 58 permits the trailing link 54 about five degrees of universal movement. The pivot axis of the pin 56 is substantially parallel to a line A that extends between the inner universal joint 18 and the center of the bushing 58.

Tapered polyurethane bushings 62 surround the pivot pin 56 and engage spaced apart eyes formed in the end of the trailing link. The tapered polyurethane bushings 62 permit about two degrees of universal movement. These bushings are located equidistant from a line passing through the center of the bushing 58 and the point of intersection of a line joining the centers of the universal joints 18 and 22 and the horizontal load line passing through the wheel, so that there is an approximately equal load on each bushing.

Upon jounce deflection of the wheel assembly 10, the shock absorber unit 40 is contracted against the compression force of the spring 52. During this movement, the link 54 pivots about the bushing 58 and pivot pin 56. Since the pin 56 is closer to the line A than the outer universal joint 22, upward deflection of the wheel assembly 10 imparts toe-in movement to the wheel. Since the angle between the shock absorber unit 40 and the housing assembly 30 is constant owing to their rigid interconnection, upward deflection of the wheel assembly 10 results in the desired change in the camber of the wheel.

The moment which is caused by the transverse force between the wheel 10 and the ground tends to pivot the housing 30 about the outer universal joint 22. This moment is resisted by the connection of the upper end of the shock absorber piston rod 42 with the body 48. Since the length of the shock absorber 40 is greater than the radius of the wheel assembly 10, the reaction at the connection of the shock absorber 40 to the body 48 is less than the transverse force between the wheel assembly 10 and the ground.

The position of the inner universal joint 18 may be so located in a longitudinal direction of the vehicle as to give any desired steering characteristics.

As used in the claims, the term "sprung components" refers to that portion of the vehicle that is supported by the suspension spring 52. This comprises the chassis frame and the vehicle parts that are secured to it. The term "unsprung components" refers to the wheels, the wheel support members and other vehicle parts that are not spring supported.

The foregoing description covers the presently preferred embodiment of this invention. Modifications and alterations may occur to those skilled in the art as well as other embodiments that will come within the scope and spirit of the following claims.

The invention in which an exclusive property is claimed is defined as follows:

1. An independent vehicle suspension system comprising a chassis, a differential gear unit secured to said chassis, a shaft of nonextensible length extending laterally from said differential gear unit, a wheel assembly, said shaft having a universal joint at its inner end connecting it with said differential gear unit and a universal joint at its outer end connecting it with said wheel assembly, a bearing housing rotatably supporting said wheel assembly, a linearly collapsible resilient suspension unit rigidly secured at its lower end to said housing, said suspension unit extending in an upward direction and having its upper end connected to said chassis, a trailing suspension link having one end pivotally connected to said chassis by a rubber bushing, pivot means pivotally connecting the other end of said trailing suspension link to said housing, said pivot means having a fixed pivot axis generally parallel to a line drawn between the center of said bushing and the center of the inner one of said universal joints, said trailing link extending at an acute angle to said drive shaft.

2. A vehicle suspension system of the independent type comprising a vehicle chassis, a wheel assembly, a differential gear unit secured to said chassis, a transversely extending nonextensible drive shaft having inner and outer universal joints drivingly connected to said differential gear unit and said wheel assembly respectively, a bearing housing rotatably supporting said wheel assembly, a linearly collapsible suspension unit having one end rigidly connected to said housing and its other end connected to said chassis, said suspension unit resiliently supporting said chassis on said wheel assembly, a suspension link arranged at an acute angle to said drive shaft, one end of said link being pivotally connected to said chassis by a resilient bushing, pivot means pivotally connecting the other end of said link to said bearing housing, the pivot axis of said pivot means being generally parallel to a line passing through the center of said resilient bushing and the center of said inner universal joint and closer to said line than the center of said outer universal joint.

3. A vehicle suspension system of the independent type comprising a vehicle chassis, a wheel assembly, a wheel support member rotatably supporting said wheel assembly, a transversely extending nonextensible first link having inner and outer joints connected to said chassis and the wheel support member respectively, a linearly collapsible suspension unit having one end rigidly connected to said wheel support member and its other end connected to said chassis, said suspension unit resiliently supporting said chassis on said wheel assembly, a second link arranged at an acute angle to said first link, one end of said second link being connected to said chassis by a resilient bushing, pivot means pivotally connecting the other end of said second link to said wheel support member, said pivot means having a fixed pivot axis generally parallel to a line passing through the center of said bushing and the center of the inner joint of said first link.

4. A vehicle suspension system of the independent type comprising a vehicle chassis, a wheel assembly, a differential gear unit secured to said chassis, a transversely extending nonextensible drive shaft having inner and outer universal joints drivingly connected to said differential gear unit and said wheel assembly respectively, a bearing housing rotatably supporting said wheel assembly, a linearly collapsible suspension unit having one end rigidly connected to said housing and its other end connected to said chassis, said suspension unit resiliently supporting said chassis on said wheel assembly, a suspension link having one end pivotally connected to said chassis, pivot means pivotally connecting the other end of said suspension link to said bearing housing, said pivot means having a pivot axis generally parallel to a line passing through the center of the pivotal connection of said one end and the center of said inner universal joint.

5. A vehicle suspension system of the independent type comprising a vehicle chassis, a wheel assembly, a wheel support member rotatably supporting said wheel assembly, a transversely extending nonextensible first link having inner and outer joints connected to said chassis and the wheel support member respectively, a linearly collapsible suspension unit having one end rigidly connected to said wheel support member and its other end connected to said chassis, said suspension unit resiliently supporting said chassis on said wheel assembly, a second link having one end pivotally connected to said chassis, pivot means pivotally connecting the other end of said second link to said wheel support member, said pivot means having its pivot axis generally parallel to a line passing through the center of the pivotal connection of said one end and the center of the inner joint of said first link.

6. A vehicle suspension system comprising sprung and unsprung components, suspension means interconnecting said components, said suspension means including a first laterally extending link having an inner pivotal connection with said sprung components and an outer pivotal connection with said unsprung components, a linearly collapsible suspension unit having one end rigidly connected to a portion of said unsprung components and its other end connected to said sprung components, the linear axis of said unit being arranged in an upward direction, a second link arranged at an acute angle to said first link, one end of said second link being connected to said sprung components by a resilient pivotal connection, pivot means pivotally connecting the other end of said second link to said unsprung components, the pivotal axis of said pivot means being generally parallel to a line passing through the center of said resilient pivotal connection and the center of said inner connection of said first link and closer to said line than the center of said outer pivotal connection.

References Cited by the Examiner

UNITED STATES PATENTS

| 1,711,881 | 5/29 | Fornaca | 180—73 X |
| 2,228,413 | 1/41 | Smalley | 280—124 X |

FOREIGN PATENTS 642,510  6/62  Canada.

A. HARRY LEVY, *Primary Examiner.*